(12) United States Patent
Hei Ma

(10) Patent No.: US 6,655,128 B1
(45) Date of Patent: Dec. 2, 2003

(54) PURGING OF AN NOX TRAP

(75) Inventor: Thomas Tsoi Hei Ma, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 09/463,540

(22) PCT Filed: Sep. 11, 1998

(86) PCT No.: PCT/GB98/02758

§ 371 (c)(1),
(2), (4) Date: Jan. 27, 2000

(87) PCT Pub. No.: WO99/14467

PCT Pub. Date: Mar. 25, 1999

(30) Foreign Application Priority Data

Sep. 13, 1997 (GB) .............................................. 9719445

(51) Int. Cl.⁷ ................................................ F01N 3/00
(52) U.S. Cl. .............................. 60/274; 60/286; 60/295; 60/297; 60/301; 60/303; 422/172; 422/182; 423/213.2; 423/213.5
(58) Field of Search .................... 60/274, 279, 285, 60/283, 286, 300, 303, 301, 295, 297; 422/172, 182, 183; 423/213.2, 213.5, 239

(56) References Cited

U.S. PATENT DOCUMENTS

| 4,912,776 | A | * | 3/1990 | Alcorn .................... 423/239 |
| 5,353,590 | A | * | 10/1994 | Pettit et al. ................... 60/274 |
| 5,544,483 | A | * | 8/1996 | Heuer ......................... 60/283 |
| 5,770,784 | A | * | 6/1998 | Heywood et al. ........... 588/209 |
| 5,819,673 | A | * | 10/1998 | Heywood et al. ........... 110/346 |
| 6,003,305 | A | * | 12/1999 | Martin et al. ................ 60/274 |
| 6,004,520 | A | * | 12/1999 | Hartweg et al. ......... 423/213.2 |

* cited by examiner

Primary Examiner—Thomas Denion
Assistant Examiner—Binh Tran
(74) Attorney, Agent, or Firm—Brooks Kushman P.C.; Damian Porcari

(57) ABSTRACT

A lean burn engine having a lean NOx trap in the form of a matrix of narrow flow passages is described. The engine is provided with means for injecting reducing gases upstream of the NOx trap matrix (16) to purge the trap periodically. A flow straightening matrix (12) of narrow flow passages is arranged upstream of the NOx trap matrix (16) and is separated from the trap matrix (16) by a narrow chamber (14). Reducing gases are injected in bursts into the narrow chamber (14), each burst having sufficient mass and flow rate to fill the narrow chamber (14) with the reducing gases and to displace the exhaust gases previously present in the narrow chamber (14) into the narrow flow passages of the flow straightening matrix (12) and of the trap (16) without significantly mixing with the latter exhaust gases,

16 Claims, 1 Drawing Sheet

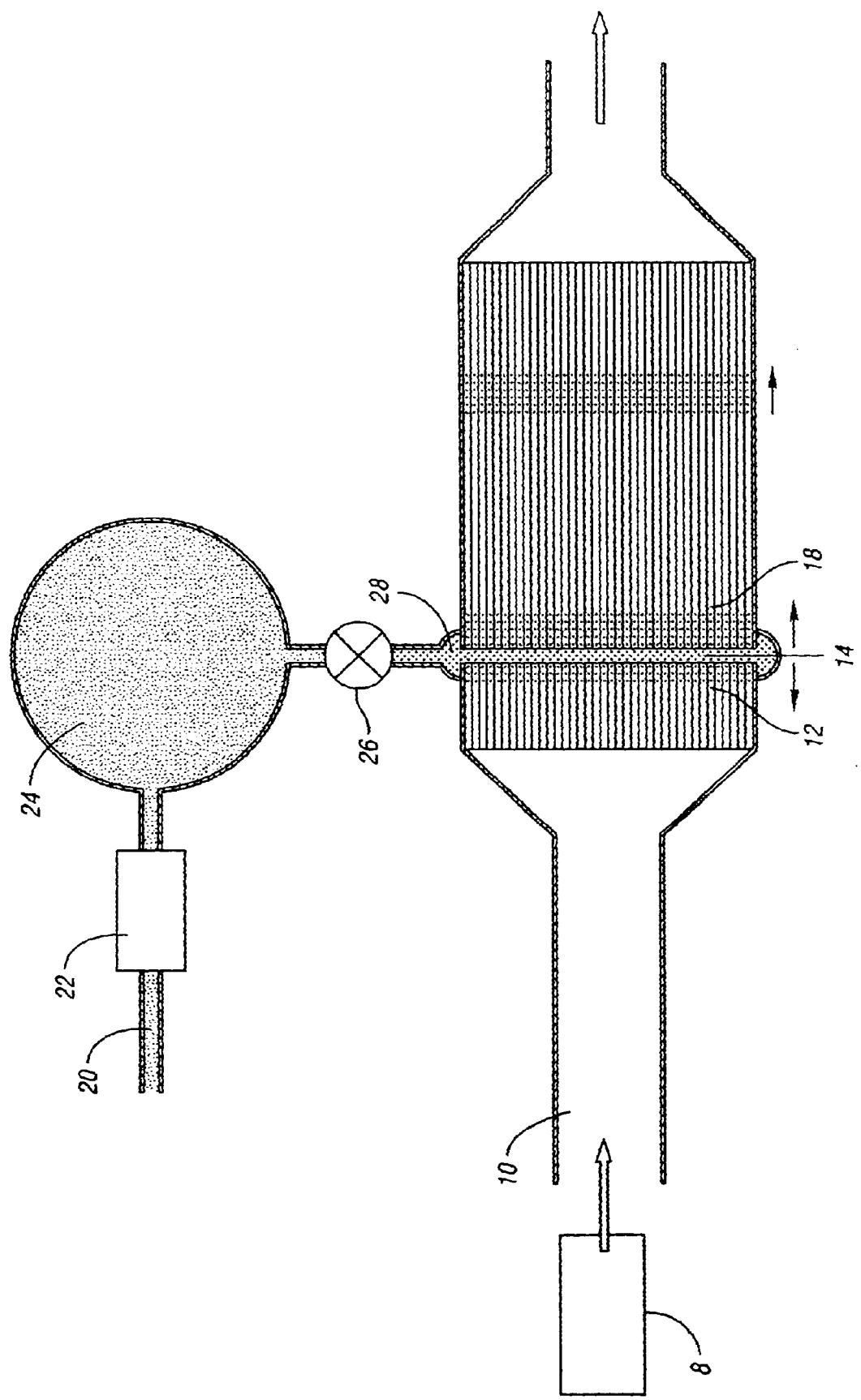

PURGING OF AN NOX TRAP

The present invention relates to engines having a storage trap for oxides of nitrogen (NOx) in the exhaust system and is concerned with the periodic purging of such a trap of stored NOx gases and regenerating of the trap from sulphur poisoning by removal of oxides of sulphur (SOx) that accumulate in the trap.

BACKGROUND OF THE INVENTION

In a lean burn spark ignition internal combustion engine used in a motor vehicle, a known method of reducing NOx emissions in the exhaust gases is to use a lean NOx trap which intercepts and stores NOx gases in batches from the oxidising atmosphere of the lean exhaust gases. The trap is purged periodically by exposing it to a reducing atmosphere, whereupon the stored NOx gases are released and are reduced to nitrogen in the presence of a catalyst before being discharged into the ambient atmosphere. If there is sulphur in the fuel, SOx will be present in the exhaust gases as well as NOx and the trap will also store the SOx gases which will in time poison the trap. To regenerate the trap from sulphur poisoning, the trap may, once again, be exposed to a reducing atmosphere but in this case the chemical reaction needs to take place at a higher temperature and must therefore either be carried out while the trap is heated or when the trap is already itself operating at a high temperature on account of the prevailing engine speed and load conditions.

A known method of exposing the trap to a reducing atmosphere involves changing the fuel calibration of the engine from a lean mixture to a rich mixture for a short period of time in order to switch the composition of the exhaust gases from excess oxygen to excess fuel. This method has the disadvantage that the operation of the engine is disturbed during the purge process which normally would cause a sudden change in the output torque of the engine and would be disconcerting to the driver of the vehicle. To avoid this, it necessary to take further complicated steps to suppress the sudden torque change so that the drive quality is not impaired.

The lean NOx trap is better positioned in the exhaust system at a substantial distance from the engine in order to ensure optimum operating temperature of the trap. A disadvantage of this, however, is that the duration of the rich operation of the engine during purging must take into account the transport and mixing of the resulting slug of rich exhaust gases with the lean exhaust gases along the exhaust pipe causing diffusion of the slug and diminishing the reducing atmosphere when the slug arrives at the trap.

Furthermore, because an oxidising catalytic converter must be provided upstream of the lean NOx trap for reducing the hydrocarbon emissions from the engine, the duration of the rich operation during purging must also take into account the oxidation by the catalytic converter of some of the excess fuel contained in the slug of rich exhaust gases before the remaining content of the slug can break through the oxidation catalytic converter. All these considerations have resulted in a relatively prolonged duration of the rich operation of the engine in order to ensure that a sufficient quantity of reducing exhaust gases can reach the lean NOx trap to purge the trap. This represents an increased penalty in the overall fuel consumption of the engine as the ratio of the durations of the rich and lean operations of the engine is increased.

SUMMARY OF THE INVENTION

With a view to mitigating the foregoing disadvantages, the present invention provides in accordance with a first aspect a method of purging a lean NOx trap that has a matrix of narrow flow passages and is arranged in the exhaust system of a lean burn engine, the method comprising the steps of providing a flow straightening matrix of narrow flow passages preceding the NOx trap matrix and separated from the NOx trap matrix by a narrow chamber, and periodically injecting reducing gases in bursts into the narrow chamber, each burst having sufficient mass and flow rate to fill the narrow chamber with the reducing gases and to displace the exhaust gases previously present in the narrow chamber into the narrow flow passages of the flow straightening matrix and of the trap without significantly mixing with the latter exhaust gases.

According to a second aspect of the invention, there is provided a lean burn engine having a lean NOx trap in the form of a matrix of narrow flow passages and means for injecting reducing gases upstream of the NOx trap matrix to purge the trap periodically, characterised in that a flow straightening matrix of narrow flow passages is arranged upstream of the NOx trap matrix and is separated from the trap matrix by a narrow chamber, and in that the means for injecting reducing gases upstream of the NOx trap matrix are operative to inject the reducing gases in bursts into the narrow chamber, each burst having sufficient mass and flow rate to fill the narrow chamber with the reducing gases and to displace the exhaust gases previously present in the narrow chamber into the narrow flow passages of the flow straightening matrix and of the trap without significantly mixing with the latter exhaust gases.

The invention allows the trap to be purged with a minimum of fuel wastage because the excess fuel injected for the purpose of purging is kept away to the extent possible from the surplus oxygen contained in the exhaust gases. Mixing of the gases is prevented on account of the narrow geometry of the chamber and of the flow passages. When the reducing gases are injected as a burst into the narrow chamber at a flow rate significantly higher than that of the exhaust gases flowing through the chamber, they rapidly fill the chamber forcing the exhaust gases into the narrow flow passages of the adjacent matrices on either side of the chamber and forming a slug of reducing gases in between the exhaust gases. This slug would interrupt the through flow of exhaust gases momentarily until the exhaust gas pressure in the upstream section of the exhaust system increases sufficiently to force its way back into the narrow chamber at which point the injected burst would be terminated. The result is that a wave of reducing gases will enter the lean NOx trap matrix and propagate along the length of the matrix without significantly mixing with the exhaust gases. The thickness of the wave will depend upon the mass of reducing gases that is injected in the time available before the through flow of exhaust gases forces its way back into the narrow chamber.

In one embodiment of the invention, the NOx trap matrix is coated not only with an NOx storage material but also with an oxygen storage material. In this case, the reducing gases can react exothermically with stored oxygen to release heat. By applying successive bursts of reducing gases at a repetition frequency which allows sufficient time between the bursts for sufficient exhaust gases to pass through to replenish the oxygen storage material with oxygen, one can heat the trap sufficiently to purge not only NOx but also any SOx that may have accumulated in the trap on account of the presence of sulphur in the fuel.

The reducing gases may be fuel vapour, a mixture of fuel vapour and air at richer than stoichiometric fuel-to-air ratio, or a mixture of fuel vapour and exhaust gases containing excess air at richer than stoichiometric fuel-to-air ratio. The rich fuel-to-air mixture may be reacted at the lean NOx trap matrix to form reducing gases such as carbon monoxide and hydrogen through partial oxidation and water-gas equilibrium reactions. The mixture may also be reacted externally before being injected into exhaust system, for example in a heated vessel which may be pressurised and may additionally contain a catalyst, a spark plug or a glow plug.

The flow straightening matrix may be a ceramic honeycomb of similar construction as that of the lean NOx trap matrix except that no coating need be applied to the surfaces of the narrow flow passages of the matrix.

The fuel vapour may be drawn from a vapour extraction system described in co-pending British Patent Application No. GB 9716156,6 for separating gasoline fuel into a lighter vapour fraction and a heavier liquid fraction. Alternatively or additionally, fuel vapour may be drawn from a vapour storage canister connected to the fuel storage tank of the engine. As a further alternative, liquid fuel may be injected under pressure into a heated vessel in which the fuel boils to form vapour and pressurises the vessel at the same time.

A vapour pump or compressor may be used to compress the reducing gases containing fuel vapour into a pressurised storage vessel from which it may be metered in bursts into the engine exhaust system in front of the lean NOx tray matrix by way of a fuel injector valve.

BRIEF DESCRIPTION OF THE DRAWING

The present invention will now be described further, by way of example, with reference to the accompanying drawing which shows schematically a lean NOx trap together with a supply of reducing gases for purging the trap.

DETAILED DESCRIPTION OF THE PREFERRED EMBODIMENT

The single FIGURE shows a section of an engine exhaust pipe 10 lying downstream of a three-way catalytic converter (not shown) connected to a lean NOx trap that comprises a ceramic matrix 16 coated with a catalyst and with a NOx storage material. Conventionally, the coated ceramic matrix would be the only constituent of the lean NOx trap but in the present invention it is preceded by a second matrix 12 that acts as a flow straightening matrix and is separated from the trap matrix 16 by a narrow chamber 14 into which reducing gases are injected in order to purge the trap matrix 16.

The chamber 14 is surrounded by an annular gallery 28 that is connected to a pressurised vessel 24 by way of a flow control valve 26. Reducing gases containing fuel vapour from a suitable fuel source is introduced under pressure into the vessel 24 by means of a compressor 22.

During operation of the engine in lean burn mode, NOx gases are absorbed by the NOx storage material of the trap matrix 16. To avoid saturation of the NOx storage material, the trap 16 has to be purged periodically. Purging of the trap requires reducing gases to be passed through the trap and conventionally this has been achieved by running the engine rich for a period of time sufficient to ensure that excess fuel breaks through the three-way catalytic convertor and reaches the NOx trap.

In the present invention, the reducing gases are injected into the chamber 14 immediately upstream of the trap matrix 16 and steps are taken to minimise the extent to which the burst of gases mixes with the oxygen containing exhaust gases of the engine. In this way such fuel as is injected for the purpose of purging the NOx trap is not wasted by reacting with surplus oxygen inevitably present in the exhaust gases of an engine running in lean burn mode.

When the burst of reducing gases is introduced into the narrow chamber 14 radially inwards from all sides at a high flow rate, it displaces such gases as are already present in the chamber 14 into the narrow flow passages of the matrices 12 and 16. The interface between the reducing gases and the exhaust gases within the passages is very small so that the two gases do not interact chemically to any significant extent. The burst of reducing gases will momentarily stop or reverse the normal flow of exhaust gases but at the end of the burst the exhaust flow will push the reducing gases forward through the trap matrix 16 as a slug or wave.

The slug of reducing gases within each passage in the trap matrix 16 will react with the stored NOx gases as it progresses along the passage. Initially there will be a band at the front of the slug that reacts with the surfaces of the passage, but as the fuel at the front of the slug is used up, the band of reaction will move towards the back of the slug as the slug advances through the passage. The reaction band as it advances will progressively purge the trap of stored NOx.

Conveniently the NOx trap matrix 16 is also coated with an oxygen storage material. In this case, the slug of reducing gases will act first to neutralise the stored oxygen thereby generating heat to assist in the subsequent purging of the stored NOx gases. The slug will therefore now have two active bands, the first band producing an exothermic reaction with the stored oxygen closely followed by the second band in which the NOx storage material, having been heated by the first band, is immediately exposed to the advancing reducing gases in the slug. Once again the two bands will move in unison towards the back of the slug as the slug advances forwards through the passage of the trap matrix 16.

Each passage of the slug of reducing gases will cause an incremental increase in the surface temperature of the NOx trap matrix 16 provided that enough time is allowed between bursts for a sufficient segment of exhaust gases to pass through to replenish the oxygen storage material with oxygen. If the repetition frequency of the bursts is fast, then the segments of exhaust gases between bursts will be short and the oxygen will only be partially replenished producing less heating of the matrix. This technique can be used to produce a series of tightly packed slugs of reducing gases for purging the trap without excessively heating the trap.

If the repetition frequency of the bursts is lower, allowing full replenishment of the oxygen storage material by the longer segments of exhaust gases between successive slugs, then the heating effect will be cumulative allowing high surface temperatures to be reached. This can be used in situations where sulphur present in the fuel causes SOx contamination of the trap. The reduction of SOx gases requires a high temperature and this can be achieved by appropriate selection of the repetition frequency of the bursts, the frequency being sufficiently low to permit oxygen replenishment but sufficiently high not to allow the trap to cool between bursts.

The pipe 20 can draw fuel vapour from a vapour extraction system as described in co-pending British Patent Application No. GB 9716156.6 or from a vapour purge canister or any suitable source of reducing gases.

Pressurising the reducing gases and storing them in the vessel 24 enable the use of a conventional electromagnetic fuel injector valve 26, known from CNG applications, to determine the duration and the timing of the bursts of reducing gases. The duration will be controlled by the pulse width of the injector valve 26 which sets the quantity of reducing gases in each slug. The timing on the other hand will be determined by the frequency and the phase of the injector valve (26). The frequency will be varied as described above to regulate the purging and heating of the trap while the phase can be optimised in relation to the crankshaft angle of the engine to control the synchronisation of the bursts with naturally occurring pressure fluctuations in the exhaust system.

What is claimed is:

1. A method of purging a lean NOx trap that has a matrix (16) of narrow flow passages and is arranged in the exhaust system of a lean burn engine, the method comprising the steps of providing a flow straightening matrix (12) of narrow flow passages preceding the NOx trap matrix (16) and separated from the NOx trap matrix by a narrow chamber (14), and periodically injecting reducing gases in bursts into the narrow chamber (14), each burst having sufficient mass and flow rate to fill the narrow chamber (14) with the reducing gases and to displace the exhaust gases previously present in the narrow chamber (14) into the narrow flow passages of the flow straightening matrix (12) and of the trap (16) without significantly mixing with the exhaust gases previously present in the narrow chamber.

2. A lean burn engine having a lean NOx trap in the form of a matrix (16) of narrow flow passages and means (20, 22,24,26) for injecting reducing gases upstream of the NOx trap matrix (16) to purge the trap periodically, characterized in that a flow straightening matrix (12) of narrow flow passages is arranged upstream of the NOx trap matrix (16) and is separated from the trap matrix by a narrow chamber (14), and in that the means for injecting reducing gases upstream of the NOx trap matrix are operative to inject the reducing gases in bursts into the narrow chamber, each burst having sufficient mass and flow rate to fill the narrow chamber (14) with the reducing gases and to displace the exhaust gases previously present in the narrow chamber into the narrow flow passages of the flow straightening matrix (12) and of the trap (16) without significantly mixing with the exhaust gases previously present in the narrow chamber.

3. The lean burn engine as claimed in claim 2, wherein the NOx trap matrix (16) is additionally coated with an oxygen storage material.

4. The lean burn engine as claimed in claim 3, wherein the repetition frequency of the bursts of reducing gases is variable to vary the extent of replenishment of the oxygen storage material between bursts so as to vary the extent to which the trap matrix is heated.

5. The lean burn engine as claimed in claim 2, wherein the reducing gases are fuel vapor, a mixture of fuel vapour and air at richer than stoichiometric fuel-to-air ratio, or a mixture of fuel vapour and exhaust gases containing excess air at richer than stoichiometric fuel-to-air ratio.

6. The lean burn engine as claimed in claim 5, wherein the rich fuel-to-air mixture is reacted during engine operation at the lean NOx trap matrix (16) to form reducing gases through partial oxidation and water-gas equilibrium reactions.

7. The lean burn engine as claimed in claim 5, wherein the rich fuel and air mixture is reacted externally in a pressurized vessel before being injected into the exhaust system.

8. The lean burn engine as claimed in claim 2, wherein the flow straightening matrix (12) is a ceramic honeycomb.

9. The lean burn engine as claimed in claim 2, wherein a vapor pump or compressor (22) is provided to compress reducing gases containing fuel vapor into a pressurized storage vessel (24) from which they are metered into the chamber upstream of the NOx trap matrix by means of an injector valve (26).

10. A system for treating a flow of exhaust gases generated with an internal combustion engine, the system comprising:

an emission control device adapted to receive the flow of exhaust gases, the emission control device including an upstream, flow-straightening first matrix including a plurality of narrow flow passages, a downstream catalyst including a plurality of narrow flow passages, and a narrow chamber separating the flow-straightening matrix from the catalyst; and an injector for periodically injecting a reducing gas in bursts into the narrow chamber, each burst having a mass and a flow rate sufficient to fill the narrow chamber with the reducing gas and to displace the exhaust gases previously present in the narrow chamber into the narrow flow passages of the flow straightening matrix and of the catalyst without significantly mixing with the exhaust gases previously present in the narrow chamber.

11. The system as claimed in claim 10, wherein the catalyst includes an oxygen storage material.

12. The system as claimed in claim 11, wherein the period of the bursts is varied in order to limit an extent to which the catalyst is heated due to an oxidation of the injected reducing gas with an amount of oxygen stored in the oxygen storage material between the bursts.

13. The system as claimed in claim 10, wherein the reducing gas is one of the group consisting of fuel vapor, a mixture of fuel vapor and air at richer than stoichiometric fuel-to-air ratio, and a mixture of fuel vapor and exhaust gases containing excess air at richer than stoichiometric fuel-to-air ratio.

14. The system as claimed in claim 13, wherein the rich fuel-to-air mixture is reacted during engine operation at the catalyst to form the reducing gas through partial oxidation and water-gas equilibrium reactions.

15. The system as claimed in claim 13, wherein the rich fuel-and-air mixture is reacted externally in a pressurized vessel before being injected into the device.

16. The system as claimed in claim 10, wherein the flow straightening matrix is a ceramic honeycomb.

* * * * *

UNITED STATES PATENT AND TRADEMARK OFFICE
CERTIFICATE OF CORRECTION

PATENT NO. : 6,655,128 B1
DATED : December 2, 2003
INVENTOR(S) : Hei Ma

It is certified that error appears in the above-identified patent and that said Letters Patent is hereby corrected as shown below:

<u>Title page,</u>
Item [*] Notice, delete "141" and insert -- 515 --.

Signed and Sealed this

Twenty-third Day of August, 2005

JON W. DUDAS
*Director of the United States Patent and Trademark Office*